United States Patent

Kuhn et al.

[15] 3,696,312

[45] Oct. 3, 1972

[54] CYCLOTRON RESONANCE DEVICES CONTROLLABLE BY ELECTRIC FIELDS

[72] Inventors: Lawrence Kuhn; Varadachari Sadagopan, both of Ossining; Robert T. Tsui, Yorktown Heights, all of N.Y.

[73] Assignee: International Business Machines Corporation, Armonk, N.Y.

[22] Filed: June 30, 1970

[21] Appl. No.: 51,111

[52] U.S. Cl...........333/24 R, 321/69 NL, 324/0.5 R, 330/4.5, 330/4.8, 332/26, 333/30, 333/30 M, 333/71, 333/72, 333/83

[51] Int. Cl.............................H03h 9/22, H03h 9/30

[58] Field of Search .333/30, 30 M, 71, 72, 83, 24 G, 333/24.1; 324/0.5, 58.5; 330/4.5, 4.8, 4.9; 321/69 W, 69 NL; 332/26

[56] References Cited

UNITED STATES PATENTS

| | | | |
|---|---|---|---|
| 2,743,322 | 4/1956 | Pierce et al. | 333/24 G UX |
| 3,200,354 | 8/1965 | White | 333/30 |
| 3,423,686 | 1/1969 | Ballman et al. | 330/4.5 |
| 3,568,103 | 3/1971 | Fitzgerald | 333/72 X |
| 2,714,662 | 8/1955 | Norton | 333/24 G UX |
| 3,016,492 | 1/1962 | Landauer | 330/4.5 |

OTHER PUBLICATIONS

Experimental Investigation of Cyclotron Resonance In Metals, Azbel et al., Soviet Physics JETP, Vol. 12, No. 1, Jan. 1961, p. 58 cited

*Primary Examiner*—Paul L. Gensler
*Attorney*—Hanifin and Jancin and Jackson E. Stanland

[57] ABSTRACT

Electric field controllable devices which operate on the principle of velocity change of a wave passing therethrough. These waves can be magneto-elastic or spin waves, including surface waves. The materials used in these devices include $Ga_{2-x}Fe_xO_3$, $Cr_2O_3$, and YIG. When the electric field across the device is changed, the cyclotron resonance frequency of the device is greatly shifted, resulting in wave velocity changes up to about 50 percent. A bias magnetic field is generally applied across the devices to establish a resonance frequency. Devices include variable delays, modulators, frequency translators, wave guides, tunable filters, etc.

43 Claims, 7 Drawing Figures

INVENTORS
LAWRENCE KUHN
VARADACHARI SADAGOPAN
ROBERT T. TSUI
BY
J. E. Swaland
AGENT

CYCLOTRON RESONANCE DEVICES CONTROLLABLE BY ELECTRIC FIELDS

BACKGROUND OF THE INVENTION

1. Field of the Invention

This invention relates to resonance devices which are controllable by applied electric fields, and more particularly, to resonance devices of this type in which changes in applied electric field produce changes in the cyclotron resonance frequency of the material used in such devices.

2. Description of the Prior Art

Magnetoelectric materials, such as yttrium iron garnet(YIG), have been used to make devices such as wave guides, tunable filters, modulators, etc. In such devices, a magnetic bias field is used to establish a resonance frequency and the magnetic field is changed in order to shift the resonance frequency. These devices generally operate on bulk waves, such as magnetostrictive waves or spin waves.

The use of changing magnetic fields to shift cyclotron frequency in materials such as YIG has disadvantages. Although the change in velocity of the wave passing through the device is large when this effect is employed, these devices require a large amount of power in order to obtain large velocity changes. Changing a magnetic field necessitates driving an inductance, and consequently the rate at which a magnetic field can be changed is not great.

In addition to the problems mentioned in the preceding paragraph, the apparatus required to produce changing magnetic fields is extensive and complex. Equipment, such as coils and driving generators, is required. It is not possible to use simple planar electrodes which can be fastened to the device itself. Therefore, the devices are not ideally suited for operation on surface waves.

Although these problems have been present for a considerable time, the prior art has not provided an electric field controllable device of this type which would eliminate the burdensome requirement for a changing magnetic field. Although materials research has been extensive in the last decade and although new materials have been found, no one has been able to provide an electric field controllable resonant device in which the velocity of a wave travelling therethrough can be appreciably changed.

Accordingly, it is a primary object of this invention to provide resonant devices in which the cyclotron resonance frequency of the device is easily controlled without changing magnetic fields.

It is another object of this invention to provide improved resonant devices requiring smaller driving powers.

It is still another object of this invention to provide improved resonant devices which can be operated at very high frequencies.

A further object of this invention is to provide resonant devices which are easily fabricated and which will provide large controllable frequency shifts.

It is a still further object of this invention to provide electrically controllable resonant frequency devices which can be used with both bulk and surface type waves of many types.

SUMMARY OF THE INVENTION

These resonant devices provide a variety of functions, including those of variable delay, pulse compression, modulation, frequency translation, wave guiding, filtering, etc. In general, any device which operates on the principle of a change in the cyclotron frequency of a medium can be made by the principles of this invention. Therefore, the various classes of devices which will be described are examples which illustrate some of the many possible devices which can be made based on the use of an applied electric field to change the resonant frequency of a medium.

Broadly, these devices include a medium characterized by a cyclotron resonance frequency, means for introducing a wave into the medium, means for applying a variable electric field to said medium to change its resonance frequency, and means for detecting the wave passing through the medium. Usually, a means for applying a DC bias magnetic field to the medium is provided. However, if there is sufficient internal magnetization, such bias field will not be needed.

This invention utilizes the discovery that the cyclotron resonance frequency of three materials can be varied by an applied electric field. Whereas these materials have existed for a long time and previous resonant devices have always required a changing magnetic field for control, no one had provided a resonant device using a changeable electric field for control. Further, these resonant devices will provide large velocity changes and are ideally suited for operation with surface waves, in contrast with the prior art devices which are not well suited for surface wave operation.

The materials used as the medium having electric field controllable resonance frequencies comprise gallium iron oxide ($Ga_{2-x}Fe_xO_3$), chromium oxide ($Cr_2O_3$), and yttrium iron garnet (YIG). In these resonant devices, planar electrodes can be attached across the material sample and an electric field applied between these electrodes. This will change the velocity of the wave propagating through the material. In some cases, the electric field can be varied by an electron beam.

The foregoing and other objects, features and advantages of the invention will be apparent from the following more particular description of the preferred embodiments of the invention as illustrated in the accompanying drawings.

DESCRIPTION OF THE PREFERRED EMBODIMENT

Figures 1A, 1B, 2, 3A, 3B, 4, 5:
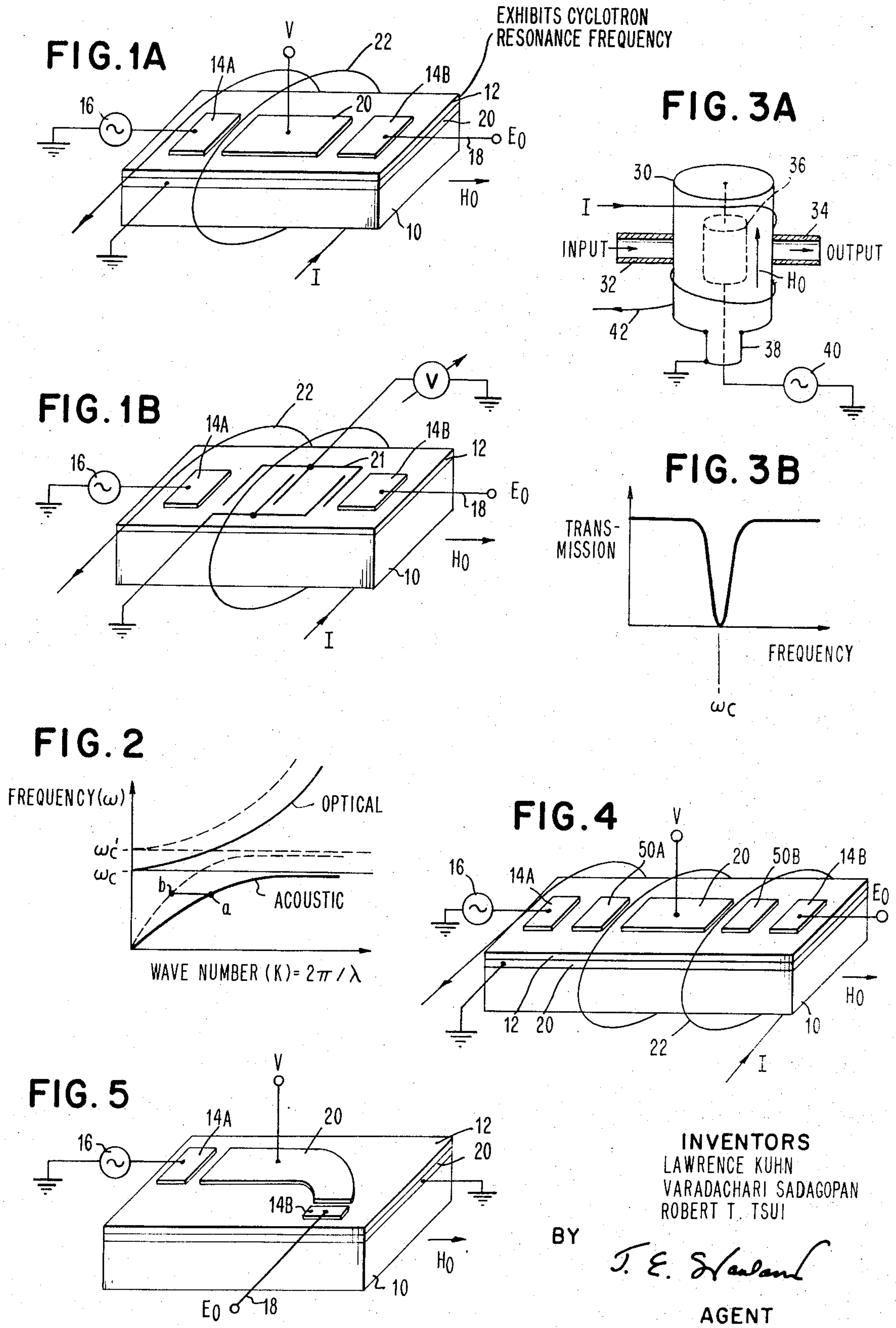
FIG. 1A is an embodiment for a resonant device suitable for use as a variable delay line, as a phase modulation device, and as a frequency translation device.
FIG. 1B is a variation of the device of FIG. 1A, in which the variable electric field is supplied in a direction parallel to the input wave.
FIG. 2 is a Brillouin ($\omega-\kappa$) diagram for the devices of FIGS. 1A and 1B, as well as for the other devices illustrated.
FIG. 3A is a tunable filter which can be tuned over a wide band by variation of the electric field across a suitable material located in a resonant cavity.
FIG. 3B is a plot of wave transmission versus frequency for the tunable filter of FIG. 3A.
FIG. 4 is a tunable filter for film-guided waves which is tuned by velocity changes of the input wave in the cavity defined by the structure.
FIG. 5 represents an embodiment of a wave-guide structure using the principles of this invention.

The embodiments to be described are merely examples of broad classes of devices which can be constructed on the principle of an electrical change in wave velocity or cyclotron resonance. In distinction with previous devices, the wave velocity is changed by a variable electric field, rather than by a variable magnetic field.

In all examples given, a change in the electric field changes the cyclotron resonance frequency of the medium. Generally, the principles of this invention are applicable to any device in which the cyclotron resonance frequency is changeable by a magnetic field. It is to be understood that the devices described herein do not represent a complete listing of all possible devices; the examples are merely representative of the different classes of devices which would be apparent to one of skill in the art based on the teaching of this invention. For the sake of clarity, the same reference numerals are used throughout the description, except in those cases where new reference symbols are required.

FIG. 1A is a resonant device which can function as a variable delay line, a modulator, or a frequency translator. It is comprised of a substrate 10 and a single crystal material 12, which is characterized by a cyclotron resonance frequency $\omega_c$ , located above or on a surface of the substrate. Located on the resonant medium 12 is an input transducer 14A and an output transducer 14B. The input transducer is connected to a means for exciting waves in the resonant medium, such as a signal voltage source 16. The output transducer 14B is shown connected to a lead 18 which provides the output signal $E_o$. Planar electrodes 20 are located on the top and bottom surfaces of resonant medium 12 and these electrodes are connected to a variable voltage source, indicated as V. It is most advantageous to locate the lower electrode on the top surface of substrate 10, rather than placing it below the substrate. Placement as shown in FIG. 1A means that a small voltage V will produce a large field across the resonant medium 12, since electrodes 20 are directly adjacent to resonant medium 12.

In order to produce bias magnetic field $H_0$ in the resonant material, a coil 22 is provided around the device. The bias magnetic field $H_0$establishes an ordering of the magnetic moments in the resonant medium 12, thereby establishing the resonance frequency $\omega_c$. In some cases, there is enough internal magnetic field within the resonant medium to enable operation without an external bias field. Generally, the magnitude of the bias magnetic field $H_0$ is small, being in the range of approximately 100 guass–1,000 guass.

The resonant medium 12 is a material whose cyclotron resonance frequency $\omega_c$ can be changed by an applied electric field. Examples include gallium iron oxide $Ga_{2-x}Fe_xO_3$, chromium oxide ($Cr_2O_3$), and yttrium iron garnet (YIG). The resonant material is generally a single crystal in order to prevent attenuation within the resonant material. The thickness of the resonant medium is usually chosen to be greater than approximately one-fourth wave length of the wave which is to be affected. This means that its thickness is usually from a few thousand angstroms to bulk dimensions. If the resonant medium is much less than approximately one-fourth wave length, the wave propagation will be dominated by the substrate properties and the effect of the thin film of resonant material will be lost.

The substrate is a single crystal material such as sapphire, mica, etc. The choice of material is not critical and a material is generally chosen to match the lattice constant and thermal expansion of the resonant medium.

The device will operate on many kinds of waves in order to affect their velocity to allow operation of functional devices. For instance, the waves could be magneto-elastic waves or spin waves propagating as bulk or surface waves, or as film-guided waves. The frequency range of the device using conventional surface wave transducers and taking into account ultrasonic attenuation would be 3MC–3,000MC. The transducers are chosen to be suitable for use with the type of wave to be employed. For instance, if it is desired to delay a magneto-acoustic surface wave, a meander line transducer of the type well known in the art could be employed. If the medium is piezoelectric, an interdigital transducer can be used. The choice of suitable transducers is within the skill of a person working with similar ultrasonic devices.

The electric field is applied in a direction normal to the direction of propagation of the wave in the embodiment of FIG. 1A. Application in this direction is not critical, as will be more fully apparent when the embodiment of FIG. 1B is discussed. Further, the magnitude of the electric field is small. Generally, the application of an electric field across the resonant medium of approximately 3,000 volts/cm will change the cyclotron resonance frequency of the material by amounts up to 50 percent. For a ten micron resonant medium, such fields correspond to a voltage of approximately 3 volts. Consequently, the device can be operated by voltages which are very small and easy to obtain in pulse operation. The resonant device of FIG. 1B is functionally similar to that of FIG. 1A, except that the electric field is applied in a direction along the propagation direction of the signal, rather than transverse to it. Electrode structure 21 is comprised of metallic fingers deposited on medium 12, one set of fingers being connected to variable voltage source V, while the other set is grounded. An in-plane electric field is produced by electrodes 21.

The advantages over resonant devices operating with magnetic field control is quite apparent based on this data. Further, as the voltage is increased or decreased, the resonant frequency is changed in different directions. Generally, as the applied electric field increases, the resonant frequency increases. The effect this has upon the change in velocity depends upon the mode in which the device was being operated before the electric field is changed, as will be more apparent when the graph of FIG. 2 is discussed.

The operating temperature of the resonant medium must be less than its transition temperature so that the material will not be paramagnetic. Operation above the transition temperature will cause the material to lose its internal magnetization and the effect of the applied electric field will be diminished. For the materials mentioned, this means that operation at room temperature is possible. Further, the material can be doped with impurities in order to affect its transition temperature. As an example, $GaFeO_3$ has a transition temperature of approximately 30°K. By adding excess iron or aluminum the transition temperature can be increased to 382°K. A relationship which is useful for determining the effect of impurities on the transition temperature is the following in the case of $Ga_{2-x}Fe_xO_3$.

1. $T_c = 382X - 97$°K
2. $0.7 \leq X \leq 1.4$

The resonant medium can be deposited on a substrate 10 in a variety of ways. For instance, thin film $Ga_{2-x}$FebxO$_3$ has been prepared by conventional RF sputtering techniques from a gallium iron oxide powder or hot pressed cathode. In order to impart a uniaxial anisotropy in the material, a magnetic field is applied in a direction parallel to the substrate during deposition. Typical sputtering conditions are the following:

Argon pressure — approximately 10 microns
Power input — approximately 1.4 watts per square cm.
Electrode voltage — approximately 1,500 volts peak-to-peak at 13.56 mHz
Base pressure — approximately $1\times10^{-7}$ torr
Substrate temperature — approximately 450°C
Substrate — fused quartz
Deposition — approximately 0.5 angstroms/second In addition to sputtering, the resonant media can be prepared by flux growth as explained in Remeika, "-$GaFeO_3$: A Ferromagnetic-Piezoelectric Compound," J. App. Phy., Supplement to Vol. 31, No. 5, May 1960, page 263S. In this method, melts were made using $Ga_2O_3$, $Fe_2O_3$, $Bi_2O_3$, and $B_2O_3$, the latter two materials being the flux. Flux grown bulk single crystals can be used for devices without the necessity of an underlying substrate. However, the substrate can be used as additional support for such devices, when required. If the resonant medium is a thin film, the use of the substrate aids mechanical properties such a strength, etc.

In addition to the methods described above, the resonant materials can be flash evaporated or deposited by chemical vapor deposition techniques. The materials listed here are known and a person of skill in the art would be able to fabricate bulk crystals and thin films which are suitable for the devices proposed herein.

As an example, the device of FIG. 1A can be fabricated in the following manner. A substrate 10, of quartz, sapphire, or mica, etc., is chosen to have a thickness of approximately 10 mils. The substrate is an oriented, single crystal, which performs a supporting function only. An electrode 20 is then deposited onto a surface of substrate 10. This electrode is generally a metal which matches the lattice constants of the substrate and the resonant medium 12. For instance, gold or niobium are well suited if $GaFeO_3$ is the resonant medium, and the substrate is one of the materials above listed. The electrode 20 is a continuous film of about 500–1,000A, and can be formed by sputtering, evaporation, chemical vapor deposition, spraying, etc. The resonant medium 12 is then deposited on electrode 20, by the methods already discussed. After this the transducers 14A, 14B are formed on resonant medium 12 and the top electrode 20 is formed by the same methods as were used to fabricate the bottom electrode.

FIG. 2 is a diagram of frequency versus wave number (Brillouin diagram) for devices, such as those of FIGS. 1A and 1B. Depending upon the frequency of the input signal, the operation of the device fits on different portions of these curves. The solid curves are those corresponding to the device operated at a resonant frequency $\omega_c$. The dashed curves are those corresponding to operation of a device at a shifted cyclotron frequency $\omega_c'$. As is readily apparent from this diagram, if the resonance frequency of the device changes, the point of operation of the device will change from a point ($a$) on the solid curve to a point ($b$) on a dashed curve. Since the dashed curves have different slopes than the solid curves, the velocity of the wave (which is the slope of the curves) will be changed.

Generally, the magnetic resonance of the medium 12 affects the passage of waves therethrough. When the frequency of the wave is close to the resonance frequency, its propagation through the medium is greatly affected. Application of an electric field changes the resonance frequency, which in turn affects the propagation of the wave. It is this interaction which is employed in the devices illustrated.

If the device of FIG. 1A or FIG. 1B is to be used as a variable delay line, the amplitude of the applied electric field is changed in order to change the pulse velocity of the wave propagating through the medium. This means that the wave will undergo a variable delay while in the portion of the crystal across which an electric field is applied. In the case of a delay line, the wave could be a surface or bulk wave including magneto-acoustic waves, and spin waves.

For the delay function, the bias on the electrodes 20 is a variable DC bias. Changing the amplitude of the bias changes the resonance frequency which in turn causes the device to operate on different curves on the $\omega$–$k$ diagram. Generally, as the amplitude of the bias is increased, the resonance frequency increases. What this does to the pulse velocity depends on the region in which the device is operated. For instance, if the device is operating on the lower branch of the $\omega$–$k$ diagram, this will cause an increase in velocity. In FIG. 2, the wave would move from position $a$ to position $b$ on a curve of greater slope.

The devices of FIG. 1A and 1B can perform phase modulation. In this case, signal information is applied to the electrodes 20 and this information is transferred to a C.W. wave going through the resonant medium 12. By applying a time varying signal on the electrodes 20, the phase velocity of the wave in the device is changed, giving rise to phase variations of the output with respect to the input wave. In this way, phase modulation is obtained.

In addition to the above uses, the devices of FIGS. 1A and 1B can be used for frequency translation. In this case, the frequency of the wave applied to the device is changed as it propagates through the device. The input pulse has a frequency approximately that of the resonance frequency of the medium 12. As the pulse propagates through the medium, the amplitude of the signal applied from the electrodes 20 is changed in order to change the cyclotron resonance frequency of the system. The pulse frequency will try to follow the resonance frequency and will emerge at the output with the new resonance frequency. In this fashion, frequency translation is provided.

FIG. 3A is an embodiment for a tunable filter. This filter is tunable over an entire band by varying the voltage applied to a resonant medium within a broad band structure. A cavity 30 has an input wave guide 32 and an output wave guide 34 coupled to it. Located within the cavity 30 is a resonant medium 36 whose cyclotron resonance can be varied by an applied electric signal. Connected to the resonant medium, by a coaxial cable 38, is a variable voltage source 40, one end of which is grounded. A coil 42, or some other suitable means, is located around resonant cavity 30. Current through the coil creates a bias magnetic field $H_0$ in the resonant medium. As with the devices of FIGS. 1A and 1B, this bias magnetic field establishes the cyclotron resonance frequency of the medium 36. The resonant medium can be single crystal or polycrystalline since in this embodiment the medium 36 does not actually propagate a wave.

This device acts as a pass filter or a stop filter depending on external wave guide circuitry and is tunable electrically over the entire band of the input and output waveguide circuitry. FIG. 3B illustrates stop band operation. It is to be understood that the pass band operation can be at different frequencies than the cyclotron resonance frequency $\omega_c$.

FIG. 4 is an embodiment of a film-guided wave tunable filter. The wave exists in a thin film of resonant material and is restricted to travel along this material. It is therefore a guided wave. The structure of FIG. 4 is similar to that of FIG. 1A, with the addition of two reflectors 50A, 50B on the resonant medium 12. These reflectors act as surface Fabry-Perot structures. The resonance frequency of the device is determined by the distance between the reflectors. More particularly, the resonance frequency is V/2 *l*, where V is the velocity of the wave in the device and *l* is the distance between reflectors 50A, 50B in the direction of travel of the wave. Consequently, if the velocity of the signal wave in the resonance structure defined by reflectors 50A, 50B is changed, the resonant frequency will be changed. The change in frequency of the device will be proportional to the change in velocity. Thus, the resonant frequency is tunable over the entire bandwidth of the external circuitry and the transducers.

In the device as illustrated, the function of the bias magnetic field is to order the spin moments of the resonant medium and to establish the cyclotron resonance frequency. The direction of application of the bias magnetic field $H_0$ is not critical. Further, the direction of application of the electric field is not critical, and can be transverse to the direction of propagation of the wave or parallel to the direction of propagation of the wave.

Since the devices of FIGS. 1A, 1B, 3A, and 4 use a changing electric field to produce wave velocity changes or resonant frequency changes, parametric interactions, such as amplification, are possible. As an example, a pump signal can be applied to the resonant medium 36 of FIG. 3A via the coaxial cable, and this pump signal will interact with the input wave in the resonant medium to amplify the input signal in a well known fashion. Generally, if the frequency of the pump voltage in the resonant medium is greater than the frequency of the input signal wave, power will be delivered from the pump wave to the signal wave.

FIG. 5 shows an embodiment for a wave guide structure utilizing a resonant medium of the type described above. It is well known that waves will propagate preferably in regions where their phase velocity is lower than that in surrounding regions.

If a resonant medium 12 has an electric field applied across it in preferred locations, the phase velocity of waves in those locations can be made less than the surrounding material. This will serve a wave guiding function. The spatially varying electric field can be created by electrodes 20 of different shapes as well as by an electron (or light) beam, which irradiates the resonant medium in different locations.

In FIG. 5, the resonant medium 12 is located on the surface of lower electrode 20. Similarly to FIGS. 1A and 1B, input transducer 14A and output transducer 14B are provided. A bias field $H_0$ is applied by a coil, not shown here. The wave introduced into the resonant medium will be confined to and guided by those regions where the phase velocity is reduced. By applying an electric field in the resonant medium in accordance with the shape of the top electrode 20, the resonant medium can be affected in such a way that the phase velocity of the wave in the material directly below curved electrode 20 is less than that of the surrounding areas. Conversely, the applied electric field can make the phase velocity of the wave greater in the region below top electrode 20. In this case, the wave will travel around the region across which the electric field is applied.

What has been described is a series of devices representative of many devices which operate by the electrical control of a magnetic resonant frequency. In some cases, the change of velocity of a magnetic wave which depends critically on the resonant frequency is utilized. In others, the resonance gives rise to electrically tunable gross impedance changes in a conventional wave guide structure.

The devices of this invention can be controlled by very small electric fields, in contrast with the prior art devices of a similar type in which only magnetic field control is possible. Whereas the prior art problems have been known for many years and these materials have been known, applicants have recognized that the unique properties of these materials could be exploited in order to produce very usable devices having great advantages over prior devices. It will be readily apparent to one of skill in the art that this teaching can be extended to devices other than those shown here, for instance, pulse expanders and compressors, etc.

What is claimed is:

1. A resonant device for signal waves traveling therethrough, comprising:

a resonant medium characterized by a cyclotron resonant frequency which is alterable when an electric field is applied to said medium, said medium comprising $Ga_{2-x}Fe_xO_3$;

means for producing a signal wave which propagates through said medium and means for detecting said signal wave after propagation in said medium;

means for applying an electric field to said medium to change said resonance frequency thereby changing the velocity of said signal wave passing therethrough;

means for producing a bias magnetic field in said resonant medium for establishing said cyclotron resonance frequency in said medium.

2. The device of claim 1, wherein said signal wave is a magneto-electric wave.

3. The device of claim 1, wherein said resonant medium is a thin film having a thickness greater than about one quarter of the wavelength of said signal wave.

4. The device of claim 1, where said electric field is applied in a direction transverse to the direction of said signal wave.

5. The device of claim 1, wherein said signal wave has a frequency approximately the same as said resonance frequency.

6. The device of claim 1, including reflecting elements on said resonant medium, said reflecting elements confining said signal wave in a cavity whose dimensions determine the resonant frequency of said device.

7. The device of claim 1, further including a cavity in which said resonant medium is located, the electric field variations across said resonant medium determining the frequency of said cavity.

8. The device of claim 1, wherein said signal waves are spin waves.

9. A resonant device for signal waves propagating therethrough comprising:

a resonant medium characterized by a cyclotron resonance frequency which is alterable when an electric field is applied to said medium, said medium being comprised of $Ga_{2-x}Fe_xO_3$;

means for producing a signal wave which propagates in said resonant medium, bias means for establishing said resonance frequency in said medium, said bias means producing a magnetic field across said resonant medium;

electric means connected to said resonant medium for establishing an electric field at selected portions therein, said electric means being capable of producing time variable and amplitude variable electric fields in said resonant medium for alteration of said cyclotron resonance frequency, means for detecting said signal wave after propagations in said resonant medium.

10. The device of claim 9, wherein said signal wave is a magneto-electric wave.

11. The device of claim 9, wherein said electric field is applied to said medium in a direction transverse to the direction of propagation of said signal wave in said resonant medium.

12. The device of claim 9, wherein said signal wave has a frequency approximately equal to said cyclotron resonance frequency.

13. The device of claim 9, including a cavity in which said resonant medium is located, said cavity having a signal wave transmission characteristic which is determined by the electric field applied to said resonant medium.

14. The device of claim 9, where said signal wave is a spin wave.

15. The device of claim 9, wherein said resonant medium is a thin film having a thickness greater than about one quarter of the wavelength of said signal wave, and a temperature not exceeding the transition temperature of said medium.

16. The device of claim 15, further including cavity defining means located on said resonant medium, the spacing of said cavity defining means determining the resonant frequency of said device.

17. A resonant device for signal waves propagating therethrough comprising:

a thin film resonant medium supported on a substrate, said film having a thickness at least approximately one-quarter of said signal wave length, said medium being characterized by a cyclotron resonance frequency which is alterable when an electric field is applied to said film;

means for producing said signal waves which propagate through said resonant medium;

bias means for establishing said cyclotron resonance frequency in said resonant medium;

means including planar electrodes located on said resonant medium for creating an electric field therein to change said cyclotron resonance frequency, said electric field being produced in selected portions of said resonant medium determined by the geometry of said electrodes;

means for detecting said signal waves after propagation in said resonant medium.

18. The device of claim 17, further including cavity defining means located on said resonant medium for confining said signal waves, said electrodes producing an electric field within said cavity which alters the resonant frequency of said cavity.

19. The device of claim 17, wherein said electric field is produced in a direction parallel to the direction of propagation of said wave in said resonant medium.

20. A resonant device for signal waves propagating therethrough, comprising;

a resonant medium comprising $Ga_{2-x}Fe_xO_3$ having a cyclotron resonance frequency which is alterable when electric fields are applied to said medium, means for producing magneto-electric signal waves which propagate through said medium;

means for applying an electric field to said resonant medium to change said cyclotron resonance frequency thereby affecting the propagation of said signal waves through said medium, means for detecting said signal waves after propagation through said resonant medium.

21. A resonant device for signal waves propagating therethrough, comprising:

a resonant medium comprising $Cr_2O_3$ having a cyclotron resonance frequency which is alterable when electric fields are applied to said medium, means for producing magneto-electric signal waves which propagate through said medium, means for applying an electric field to said resonant medium to change said cyclotron resonance frequency, thereby affecting said signal waves propagating therethrough, means for detecting said signal waves after propagation in said resonant medium.

22. A resonant device for signal waves propagating therethrough, comprising:

a resonant medium comprising YIG having a cyclotron resonance frequency which is alterable when electric fields are applied to said resonant medium, means for producing magneto-electric signal waves which propagate through said resonant medium, means for applying a variable electrical field to said medium to change said cyclotron resonance frequency, thereby affecting the propagation of said signal waves therethrough, means for detecting said signal waves after propagation in said resonant medium.

23. A resonant device for signal waves propagating therethrough, comprising:

a resonant medium comprising $Ga_{2-x}Fe_xO_3$ having a cyclotron resonance frequency which is alterable when electric fields are applied to said medium, means for producing a signal spin wave which propagates through said medium, means for applying an electric field to said medium to change said cyclotron resonance frequency to affect the propagation of said signal wave therethrough, means for detecting said signal wave after propagation in said resonant medium.

24. A resonant device for signal waves propagating therethrough, comprising:

a resonant medium comprising $Cr_2O_3$ having a cyclotron resonance frequency which is alterable when electric fields are applied to said medium, means for producing signal spin waves which propagate through said medium, means for applying an electrical field to said medium to change said cyclotron resonance frequency to alter the propagation of said signal waves therethrough, means for detecting said signal wave after propagation in said resonant medium.

25. A resonant device for a signal waves ptopagating therethrough, comprising:

a resonant medium comprising YIG having a cyclotron resonance frequency which is alterable when electric fields are applied to said medium, means for producing signal spin waves which propagate through said medium, means for applying a variable electric field to said medium to change said cyclotron resonance frequency for alteration of propagation of said signal waves, means for detecting said signal waves after propagation in said resonant medium.

26. A resonant device for signal waves propagating therethrough, comprising:

a resonant medium characterized by a cyclotron resonance frequency which is alterable when electric fields are applied to said medium, said medium being comprised of $Cr_2O_3$;

means for producing a signal wave which propagates through said medium and for detecting said signal wave after propagation in said medium;

means for applying an electric field to said medium to change said resonance frequency thereby changing the velocity of said signal wave passing therethrough;

means for producing a bias magnetic field in said resonant medium for establishing said cyclotron resonance frequency in said medium.

27. The device of claim 26, wherein said signal wave is a magneto-electric wave.

28. The device of claim 26, wherein said signal wave is a spin wave.

29. The device of claim 26, further including a cavity in which said resonant medium is located.

30. A resonant device for signal waves propagating therethrough, comprising:

a resonant medium characterized by a cyclotron resonance frequency which is alterable when electric fields are applied to said medium, said medium being comprised of YIG;

means for producing a signal wave which propagates through said medium and for detecting said signal wave after propagation in said medium;

means for applying an electric field to said medium to change said resonance frequency thereby changing the velocity of said signal wave propagating therethrough;

means for producing a bias magnetic field in said resonant medium for establishing said cyclotron resonance frequency in said medium.

31. The device of claim 30, wherein said signal wave is a magneto-electric wave.

32. The device of claim 30, wherein said signal wave is a spin wave.

33. The device of claim 30, further including a cavity in which said resonant medium is located.

34. A resonant device for signal waves propagating therethrough comprising:

a resonant medium characterized by a cyclotron resonance frequency which is alterable when an electric field is applied to said medium, said medium being comprised of $Cr_2O_3$, means for producing a signal wave which propagates in said resonant medium, bias means for establishing said resonance frequency in said medium, said bias means producing a magnetic field across said resonant medium;

electric means connected to said resonant medium for establishing an electric field at selected portions therein, said electric means being capable of producing time variable and amplitude variable electric fields in said resonant medium for alteration of said cyclotron resonance frequency, means for detecting said signal wave after propagation in said resonant medium.

35. The device of claim 34, wherein said signal wave is a magneto-electric wave.

36. The device of claim 34, where said signal wave is a spin wave.

37. The device of claim 34, further including a cavity in which said resonant medium is located.

38. A resonant device for signal waves propagating therethrough comprising:

a resonant medium characterized by a cyclotron resonance frequency which is alterable when an electric field is applied to said medium, said medium being comprised of YIG, means for producing a signal wave which propagates in said resonant medium, bias means for establishing said resonance frequency in said medium, said bias means producing a magnetic field across said resonant medium;

electric means connected to said resonant medium for establishing an electric field at selected portions therein, said electric means being capable of producing time variable and amplitude variable electric fields in said resonant medium for alteration of said cyclotron resonance frequency, means for detecting said signal wave after propagation in said resonant medium.

39. The device of claim 38, wherein said signal wave is a magneto-electric wave.

40. The device of claim 38, wherein said signal wave is a spin wave.

41. The device of claim 38, further including a cavity in which said resonant medium is located.

42. A resonant device for signal waves propagating therethrough, comprising:

a resonant medium characterized by a cyclotron resonance frequency which is alterable when electric fields are applied to said medium, reflecting elements located on said medium for confining said signal wave, the spacing of said reflecting elements determining the resonance frequency of said device, means for producing a signal wave which propagates through said medium, means for applying an electric field to said medium to change said cyclotron resonance frequency, means for detecting said signal wave after propagation in said resonant medium.

43. A resonant device for signal waves propagating therethrough, comprising:

a resonant medium characterized by a cyclotron resonance frequency which is alterable when electric fields are applied to said medium, a broad band cavity in which said resonant medium is located, means for producing a signal wave which propagates through said medium, means for applying an electric field to said medium to change said cyclotron resonant frequency, means for producing a bias magnetic field across said resonant medium, means for detecting said signal wave after propagation in said resonant medium.

* * * * *